Feb. 21, 1928.  1,659,943
G. H. CURTISS
AUTOMOTIVE VEHICLE
Filed Nov. 7, 1925
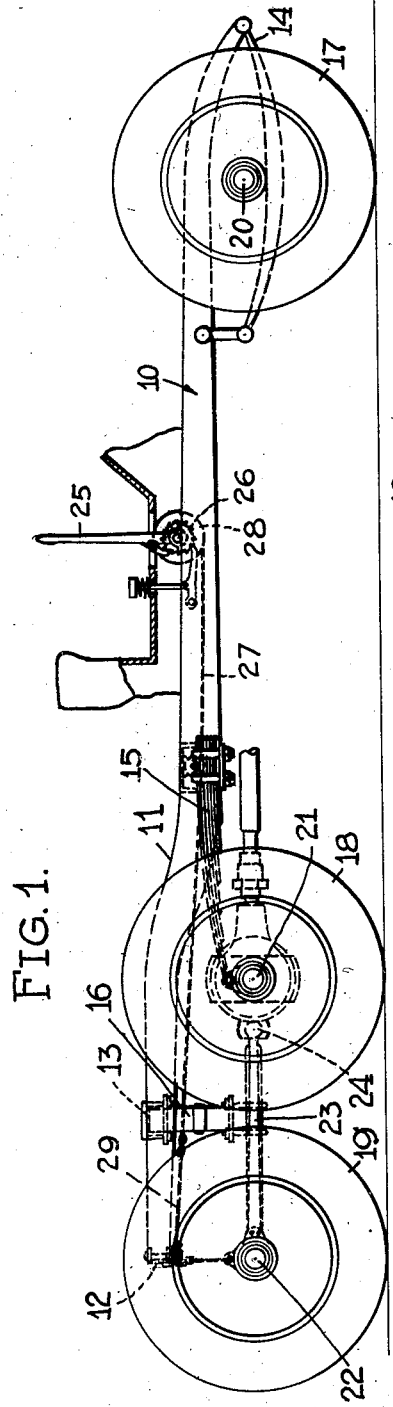
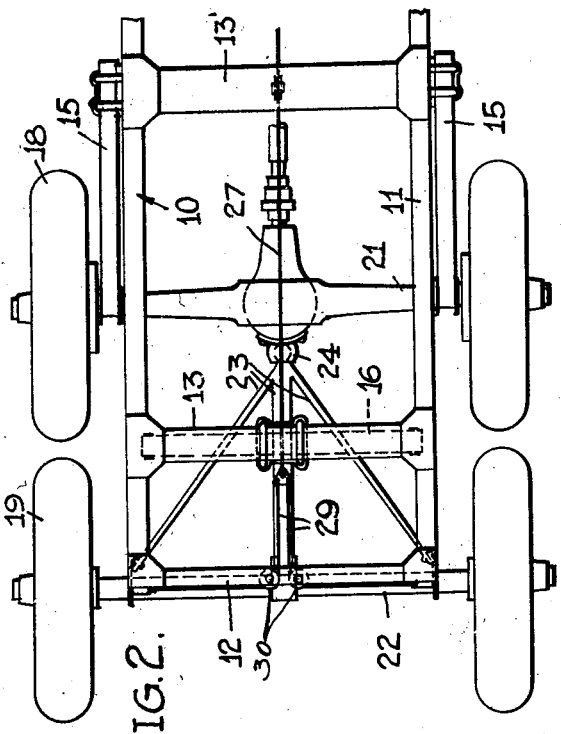
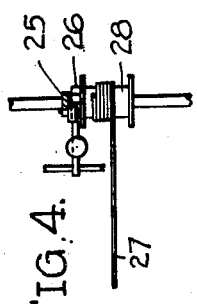
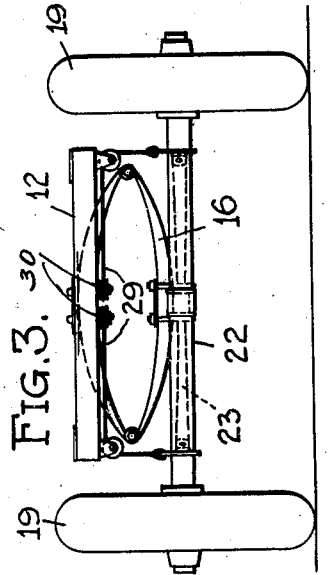
INVENTOR
GLENN H. CURTISS.
BY W. Staes Jr
ATTORNEY Patented Feb. 21, 1928.

1,659,943

UNITED STATES PATENT OFFICE.

GLENN H. CURTISS, OF HIALEAH, FLORIDA.

AUTOMOTIVE VEHICLE.

Application filed November 7, 1925. Serial No. 67,555.

My invention relates to road vehicles and is more particularly concerned with the so-called six wheel automobile.

In the design and construction of a six wheel automobile chassis, it has heretofore been the practice to so mount the four rear supporting wheels beneath the chassis frame as to distribute a given portion of the total rear end weight of the machine equally over all of said wheels. Usually but two of the four rear wheels are driving wheels, the remaining two being non-driving, tho so related to said driving wheels as to improve very materially the riding qualities of the machine. Under ordinary good road operating conditions, where maximum traction in starting and stopping is unnecessary, the above arrangement is perfectly satisfactory—the fractional part of the total load carried by the driving wheels being ample to insure sufficient traction to start, proceed and stop at will. Under adverse road conditions, such for instance as where slippery or soft road beds are encountered and maximum traction is required, the above arrangement is hardly satisfactory. Instead of obtaining the full tractive effort now obtained where the rear end of the machine is wholly supported by the driving wheels alone, the tractive effort obtained is approximately reduced by half, and since, in the ordinary six wheel chassis, no provision is made for increasing the tractive effort under such adverse road conditions, obviously the driving wheels will merely spin or revolve without gripping the road bed or taking hold as required.

Now the primary object of the present invention is to so arrange and organize the four rear supporting wheels of a six wheel automobile chassis as to improve very materially the riding qualities of the machine, and yet, at the same time, should occasion demand, admit of the transfer of the full rear end weight of the machine onto the two driving wheels thereof notwithstanding the fact that such full rear end weight is normally jointly carried by all of the four rear wheels. In thus shifting the weight normally carried by the non-driving rear wheels onto the driving wheels, that degree of tractive effort now obtained in the ordinary automobile, is secured in a six wheel chassis. Preferably the operating mechanism whereby such weight transfer is made possible, is operable, at the will of the driver, from a point in convenient proximity to the driver's seat.

The manner in which the invention is carried into effect, as well as certain objects and advantages resulting from the structure disclosed, will be hereinafter pointed out.

In the drawings, wherein like reference characters denote like or corresponding parts, Fig. 1 is a side elevation of a six wheel automobile chassis constructed in accordance with the invention herein claimed;

Fig. 2 is a plan view of the rear end portion of said chassis;

Fig. 3 is a rear end elevation of the chassis, and

Fig. 4 is a detail view of the operating mechanism by which the non-driving rear wheels of the chassis are elevated clear of the ground.

In the embodiment of the invention selected for illustration the chassis frame is designated in its entirety as 10. It comprises the usual side frame members 11 and cross-frame members 12, 13 and 13', only three of which (the three rear cross-frame members) are shown. Said frame 10, at its forward end, is yieldingly supported by front springs 14 and at its rear end it is yieldingly supported by rear springs 15. These springs, four in number, two front and two rear, provide a four-point suspension for the chassis frame. In addition to the springs 14 and 15, said frame 10 is additionally supported at its rear end by a transversely extending full elliptic spring 16 fastened to the frame 10 directly beneath the cross-frame member 13 thereof. The manner in which the spring 16 is fastened beneath the frame 10, and the manner in which it is supported from beneath, is described in a co-pending application filed August 8, 1925, Serial Number 48,922, except that in said co-pending application the spring 16 is fastened beneath a secondary or auxiliary chassis frame, whereas in the present invention the chassis frame 10 is built as a unit structure.

The running gear for the chassis includes front or steering wheels 17 and two pairs of rear wheels 18 and 19, the former pair, 18, being the driving wheels of the vehicle. The wheels 19, which function jointly with the wheels 18 in normally supporting the rear end weight of the chassis frame, are non-driving at all times. The front wheels 17 are mounted on a front axle 20 and are appropriately connected with the steering mechanism (not shown). The rear driving wheels 18 are mounted on a rear axle 21 and are adapted to be driven thru appropriate power transmission mechanism by the motor or power plant (not shown). Except for the manner in which said wheels 18 are mounted beneath the chassis frame, said rear wheels 18 are adapted to function exactly as are the rear wheels of the ordinary four wheel automobile chassis.

To improve the riding qualities of the machine, and to admit of the use of a longer vehicle body, the rear non-driving wheels 19 are provided. Said wheels 19 (see Fig. 2) are mounted directly behind the driving wheels 18 on an axle 22. They (the wheels 19) track immediately behind the wheels 18 where they are held in perfect alignment with said wheels by means of a fan-like arrangement of reach rods 23 fastened to the axle 22 at their rear ends and commonly fastened by means of a ball and socket joint 24 to the rear axle 21 at their forward ends. Thus mounted, the non-driving wheels 19 and the axle 22 therefor are free to yield vertically independently of the driving wheels 18, the spring 16 resisting such yielding movement at all times. Said spring 16, directly beneath its point of attachment to the chassis frame 10, is fastened to the centrally disposed reach rod 23 extended between the two rear axles.

An automobile chassis frame supported at its rear end as above set forth, is advantageous as compared to the ordinary four wheel chassis in that the riding comfort experienced by the occupant or occupants of the vehicle is very materially improved. Each of said rear wheels 18 and 19 normally supports an equal portion of the rear end weight of the machine and since the wheels 18 and the wheels 19 are at all times capable of relative movement, obviously most, if not all, ordinary road shocks which would ordinarily be transmitted to the chassis frame are absorbed by the springs 15 and 16 herein shown. This is particularly emphasized in view of the location of the spring 16 intermediately of and substantially midway between the two rear axles.

The means for elevating the non-driving wheels 19 above the road bed in the event that a maximum of tractive effort is required, comprises an operating lever 25, suitable pawl and ratchet mechanism 26, and an operating cable or chord 27. Said lever 25 is mounted in convenient proximity to the driver's seat. Thru its operation, the cable or chord 27 is wound upon a drum 28. In winding the chord or cable 27 upon the drum 28, the rear wheels 19 are lifted vertically until clear of the road bed. Said cable 27 at its rear end is branched as at 29. These separate branches extend laterally, at the rear end of the chassis frame, each being connected to the axle 22 adjacent its opposite ends. If desired, said operating cable may be trained over one or more pulleys 30 mounted on the chassis frame. In lifting the rear non-driving wheels 19, the rear axle 22 and the reach rods 23 which support it, are also moved, such movement being against the expanding action of the spring 16 which bears at one end on the center rod 23. To the end that the said wheels 19 may be elevated and to the end that the said wheels 19 may yield independently of the wheels 18, the universal joint 24 is provided.

An automobile chassis characterized as above set forth is very desirable. Maximum tractive effort may be obtained at any time thru the operation of the lever 25. As the wheels 19 are raised, that portion of the weight of the machine normally carried thereby is shifted onto the driving wheels 18, and since the latter, the wheels 18, are at all times in contact with the road bed, obviously a maximum of tractive effort can be obtained. Should one of the tires for the wheels 19 be punctured, and it is inconvenient at the time to change tires or effect the necessary repairs, the driver can, without getting out of the machine, raise said punctured or flat tire clear of the road bed, and immediately thereafter drive on, without injuring either the flat tire or the wheel rim as a result. Moreover, so long as tire troubles are confined to the wheels 19, all jacking-up of said wheels thru the use of a wheel-jack is avoided. The lever 25 can be used or operated instead.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. The combination, in a road vehicle, of a chassis frame, a rear axle, rear driving wheels mounted on said axle, a direct yielding connection between said axle and said frame, an auxiliary axle mounted behind said rear axle, non-driving wheels mounted on said auxiliary axle, an axle frame pivotally fastened at its forward end to said rear axle and supporting at its rear end said auxiliary axle, a yielding connection between the axle frame and the chassis frame, and means for elevating the rear end of said axle frame to raise the non-driving wheels out of engagement with the road bed.

2. The combination, in a road vehicle, of a chassis frame, a rear axle, rear driving wheels mounted on said axle, a direct yielding connection between said axle and said frame, an auxiliary axle mounted behind said rear axle, non-driving wheels mounted on said auxiliary axle, an axle frame pivotally fastened at its forward end to said rear axle and supporting at its rear end said auxiliary axle, a spring interposed between the axle frame and the chassis frame intermediately of the ends of said axle frame to normally hold said non-driving wheels in contact with the road bed, and means operable to compress said last mentioned spring and raise said non-driving wheels out of contact with the road bed without correspondingly lowering the driving wheels, said driving wheels being incapable of corresponding vertical movement.

3. The combination, in a road vehicle, of a chassis frame, a rear axle, rear driving wheels mounted on said axle, longitudinally extending springs directly fastened to said rear axle and to said chassis frame, an auxiliary axle mounted behind said rear axle, non-driving wheels mounted on said auxiliary axle, an axle frame pivotally fastened at its forward end to said rear axle and supporting at its rear end said auxiliary axle, a transversely extending spring directly fastened to said axle frame at a point intermediately of its ends and to said chassis frame to normally hold said non-driving wheels in contact with the road bed, and means for elevating the rear end of said axle frame against the urge of said transverse spring to raise the non-driving wheels out of engagement with the road bed.

In testimony whereof I hereunto affix my signature.

GLENN H. CURTISS.